United States Patent
Kuo et al.

(10) Patent No.: US 8,383,264 B2
(45) Date of Patent: Feb. 26, 2013

(54) CURRENT COLLECTING POST SEAL FOR HIGH DURABILITY LITHIUM-ION CELLS

(76) Inventors: Han Cheng Kuo, Burlington, MA (US); Chun-Chieh Chang, Ithaca, NY (US); Tsun-Yu Chang, Taichung (TW)

( * ) Notice: Subject to any disclaimer, the term of this patent is extended or adjusted under 35 U.S.C. 154(b) by 754 days.

(21) Appl. No.: 12/427,784

(22) Filed: Apr. 22, 2009

(65) Prior Publication Data
US 2010/0273046 A1    Oct. 28, 2010

(51) Int. Cl.
*H01M 2/08* (2006.01)
*B29C 65/00* (2006.01)

(52) U.S. Cl. ........ 429/175; 429/163; 429/164; 429/178; 429/179; 156/308.2

(58) Field of Classification Search ............... 429/163, 429/164, 175, 178, 179; 156/308.2
See application file for complete search history.

(56) References Cited

U.S. PATENT DOCUMENTS

| | | | | |
|---|---|---|---|---|
| 6,132,900 | A * | 10/2000 | Yoshizawa et al. | 429/185 |
| 6,459,566 | B1 | 10/2002 | Casby et al. | 361/517 |
| 6,573,001 | B1 | 6/2003 | Shinohara et al. | 429/185 |
| 2006/0051664 | A1 * | 3/2006 | Tasai et al. | 429/161 |
| 2008/0292954 | A1 | 11/2008 | Park | 429/163 |

\* cited by examiner

*Primary Examiner* — Patrick Ryan
*Assistant Examiner* — Alex Usyatinsky
(74) *Attorney, Agent, or Firm* — Kratz, Quintos & Hanson, LLP

(57) ABSTRACT

A cover assembly for a Lithium-ion battery container to improve the durability of the battery. A high pressure injection molded polymer is combined with flanges disposed on the current collecting posts of the battery to provide an improved seal for the battery cover, especially at the interface of the cover and the current collecting posts. The injection molded polymer is fused to the flanges, current collecting posts and container cover to result in a diffusion path of increased length for gases and/or liquids which are known to enter or escape from battery containers. Additional polymer layers can be applied to the assembly to further improve the seal.

25 Claims, 16 Drawing Sheets

Side view

Top flange and bottom flange utilized for pre-stressing the first injection molded polymer layer

Side view

Second polymer body that protects the edge of the top flange

Side view

Under layers for fusing the surfaces
to the first polymer body

Side view

Second polymer body leaves the safety vent area not covered

Side view

Side view

Electrolyte Filling Port

Safety Vent

Top view

CURRENT COLLECTING POST SEAL FOR HIGH DURABILITY LITHIUM-ION CELLS

FIELD OF THE INVENTION

The purpose of the present invention is to make high durability lithium ion batteries through the innovation of structure and processing methods utilized for making the Lithium-ion battery cover. The new structure and method disclosed for making the cover extends the service life of the resultant battery. The invention provides a battery for long term applications such as home energy storage applications or electric and hybrid electric vehicles applications.

BACKGROUND OF THE INVENTION

Hermetic sealing is always a key issue determining service life of a Lithium-ion battery since a high voltage of the battery renders water decomposition or oxygen reduction if water or oxygen molecules are present in the electrolyte. Such problems are often caused by improper cell sealing. Conventionally, lithium cells are small in size and capacity. Taking type 18650 cylindrical cells as an example, the cell size is 18 mm in diameter and 65 mm in height. The cell capacity ranges from about 2.8 Ah to 1.4 Ah, according to the types of cathode materials being used for the cells. In view of the limitation of space utilized for cover construction, the metal to polymer interface at current collecting posts of the battery is usually small (only through the support of an insulation layer shaped like an O-ring) and therefore the interface can not provide a lengthy diffusion path for oxygen, water molecules or other gases or liquids penetrating through the metal to polymer interface. The situation becomes worse once a continuous high temperature cycling condition is applied to the cells (e.g. conditions such as continuous high power operation) owing to the accelerated degradation of the polymer to metal interface. The same problem is applicable for other types of lithium ion cells such as prismatic cells or even lithium polymer cells.

OBJECTS OF THE INVENTION

In order to overcome the aforementioned problem, a new structure of a battery container cover is disclosed having new methods for fabricating the cover. With proper structure and methods being implemented in the battery container cover, durable lithium ion batteries having extended service life (targeted as 20 years) can be expected. A good seal, especially at the current collecting posts, is critical for large batteries (capacity more than 10 Ah) being utilized in large scale energy storage systems and or high power applications such as electric and hybrid electric vehicles that require long service life and continuous high power capabilities.

SUMMARY OF THE INVENTION

A cover assembly for a Lithium-ion battery container having a cover for sealing a top opening of a battery container, the cover defining one or more openings for current collecting posts. The cover assembly further includes a current collecting post extending through each opening and having a gap between the current collecting post and the cover, a top flange encircling each current collecting post, disposed to be opposed to and displaced from a top surface of the cover and extending radially outward from the current collecting post to beyond edges of the opening, a bottom flange encircling each current collecting post, disposed to be opposed to and displaced from a bottom surface of the cover and extending radially outward from the current collecting post to beyond edges of the opening, and a first polymer body for each current collecting post. The first polymer body is continuous and extends to fill all gaps formed between any of the cover, current collecting post, top flange and bottom flange, and the first polymer body is fused to the cover, current collecting post, top flange and bottom flange where contacting same.

DESCRIPTION OF THE DRAWINGS

The invention will become more readily apparent from the following description of preferred embodiments thereof shown, by way of example only, in the accompanying drawings, wherein.

DETAILED DESCRIPTION OF THE INVENTION

The key concepts being applied to the cover structure are described as follows:
  a. The increase of a diffusion path of gases and /or liquid into or out of the battery.
  b. The strengthening of a metal to polymer interface at current collecting posts of the battery.

EXAMPLE I

The Basic Form of the Present Invention

Figure 1A:
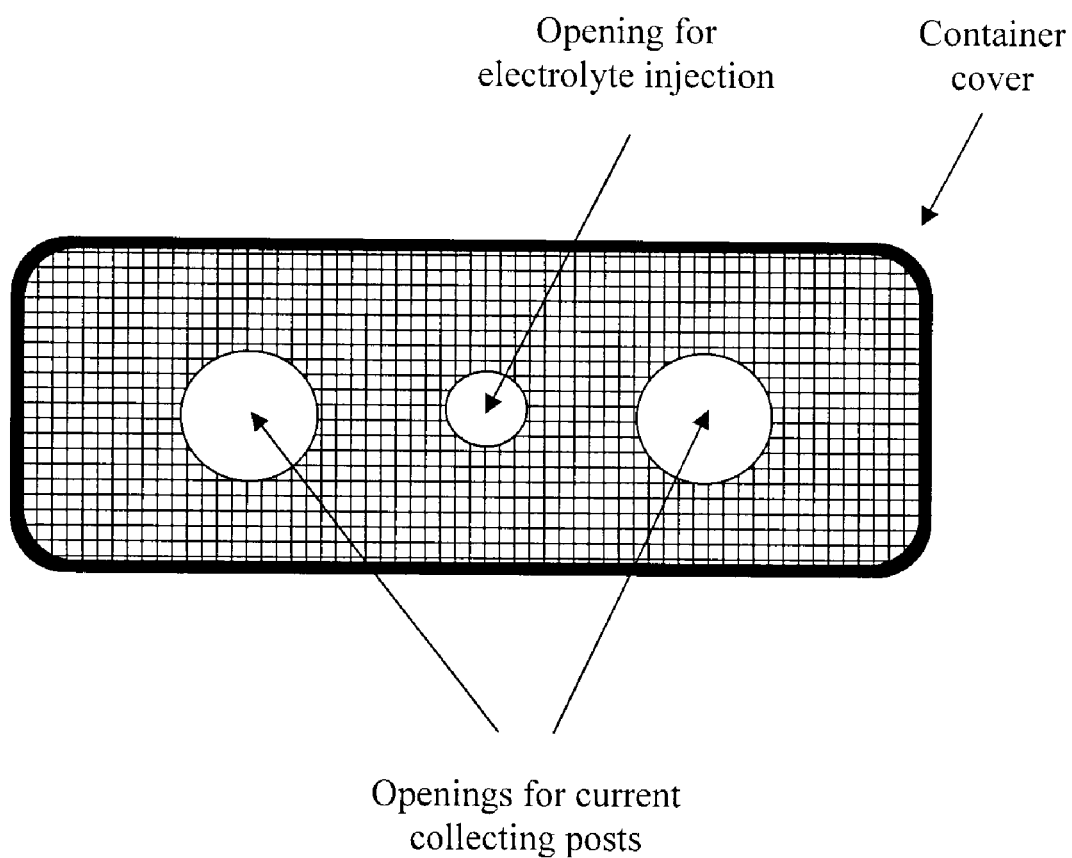
FIG. 1(a) is a top view of a container cover of the invention.

FIG. 1(a) shows a top view of a cover for a top opening of a battery container. For clarity in describing the method of the invention, step by step assembly of the cover is shown in the form of side views in FIGS. 1(b) through FIG. 1(f).

Figure 1B:
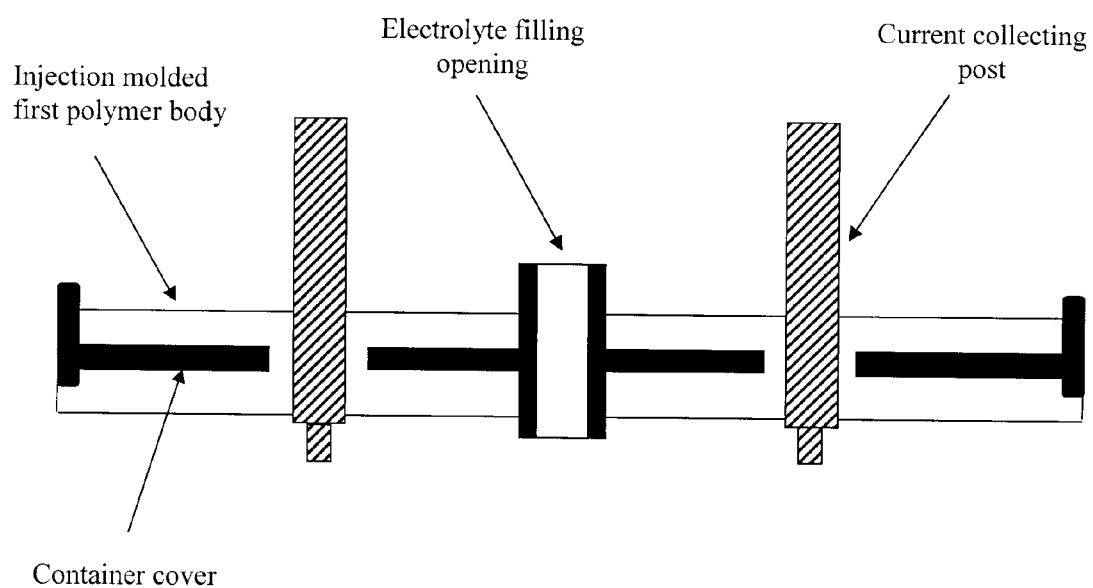
FIGS. 1(b) to 1(g) are side views of a cover assembly of the invention, showing progressive steps of a first fabrication method.

FIG. 1(b) shows the first step in fabricating the cover assembly. A first polymer body is disposed on a top and bottom surface of the container cover through an injection molding process. Current collecting posts which extend through openings in the cover are stabilized through the injection molding process as the polymer fills a gap between the cover and the current collectors.

Figure 1C:
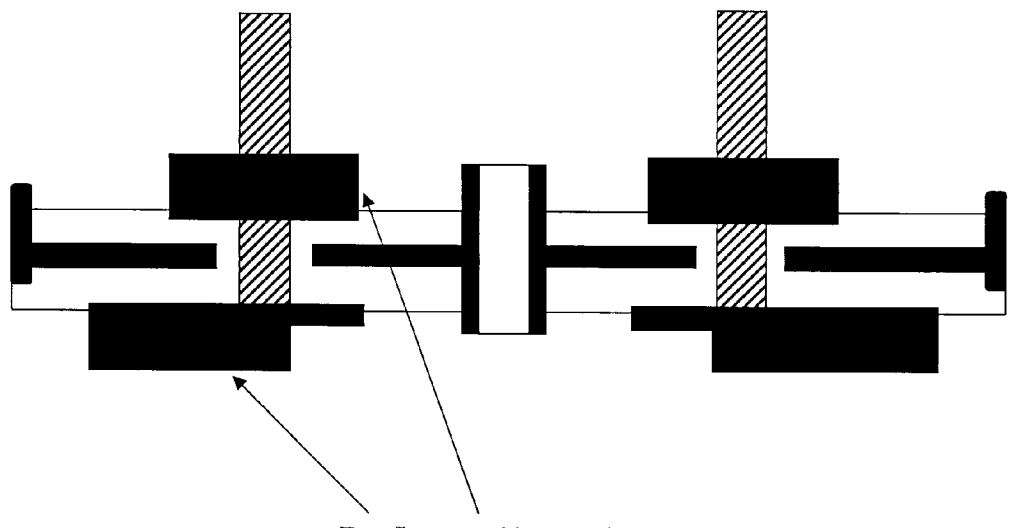

FIG. 1(c) shows a top flange and a bottom flange disposed on the conducting posts. The flanges are forced toward each other, with the injection molded first polymer body sandwiched between. The top and bottom flanges are fused to the injection molded polymer. This step is extremely important and is preferably carried out at a temperature close to the softening point of the polymer. The advantages of forcing the flanges toward each other, preferably with use of a press, tightening the top and bottom flanges together on a bolt with means of a screw, or the like, are outlined as follows:

1. Ensure contact and fusing between the injection molded first polymer body and the top and bottom flanges.
2. Ensure contact and fusing between the injection molded first polymer body and the current collecting posts. This is very important because cells constantly undergo high power operation that may induce degraded bonding between the polymer and the current collecting post.

Figure 1D:
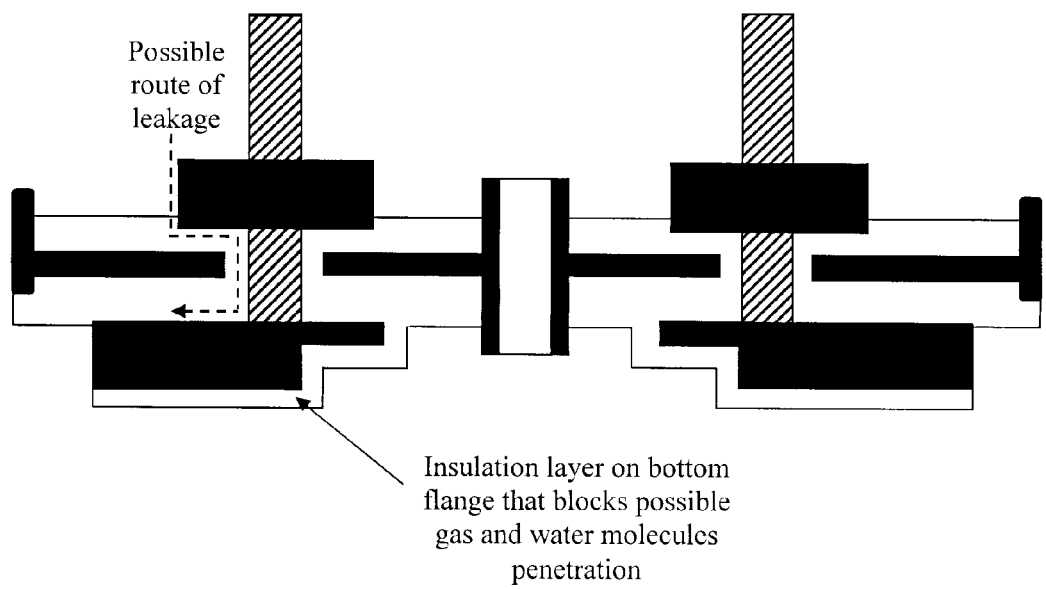

FIG. 1(d) shows a separate insulation layer that is disposed on at least the bottom surface of each bottom flange for insulating the bottom flange from the electrodes of the cell while also blocking possible leakage of gases or liquid occurring at the interface between the current collecting posts and the injection molded polymer.

Figure 1E:
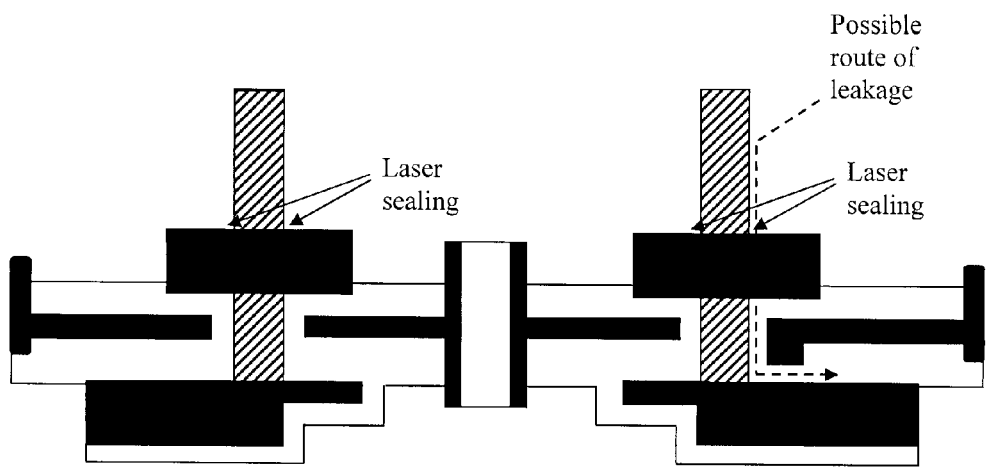

FIG. 1(e) shows the top flange being welded (e.g. laser welding method) to the current collecting post to prevent any possibility of gas or liquid molecule penetration at the interface between the top flange and the current collecting post.

Figure 1F:
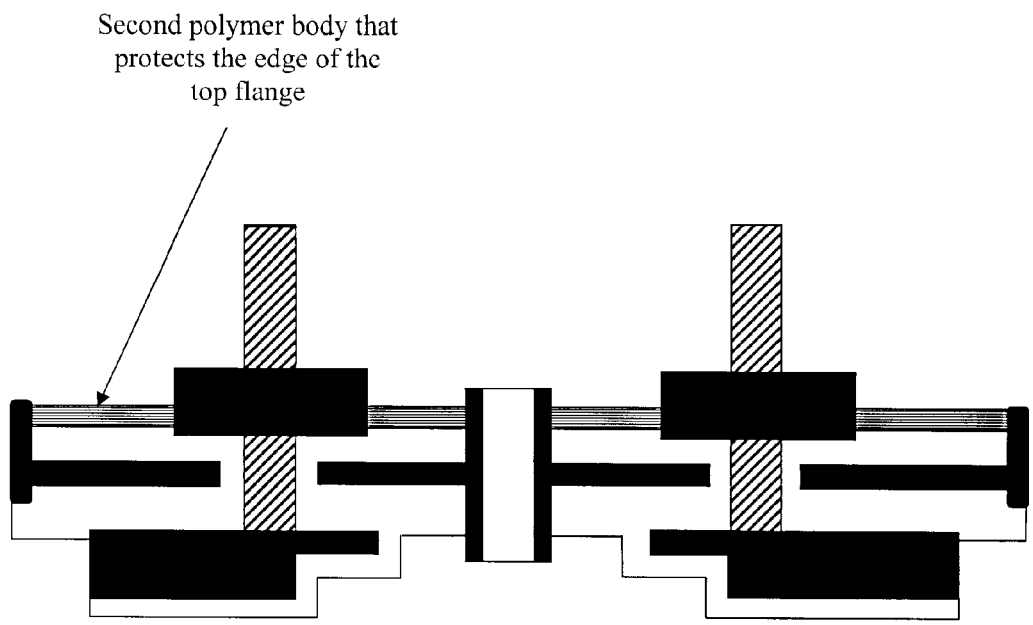

Finally, as shown in FIG. 1(f), the area at the top flanges is filled with a second polymer body that ensures no possibility of leakage at the interface between edges of the top flange and the injection molded first polymer body.

The key elements and methods involved in making the cover shown in the present example can be summarized as follows:
 a. Injection molding for making a cover monolith containing the current collecting posts.
 b. Compressing the cover monolith by forcing the top and bottom flanges toward each other.
 c. Insulation material coating on the bottom surface of each bottom flange.
 d. Laser welding between the top flanges and the current collecting posts.
 e. Filling of a second polymer on top of the first injection molded first polymer body for blocking possible penetration between edges of the top flange and the first polymer body.

The key elements and methods involved in making the cover described above are essential for resolving the problems listed below:
1. The injection molding process is feasible and preferred in the present invention because a cover monolith can be made easily possessing good interface integrity between the first polymer body and the container cover. Since the injection molding process is a high pressure process, the polymer disposed on top of the container cover may exhibit characteristic "texture" with preferred polymer crystal orientation that can be distinguished from other means in depositing polymers on top of the container cover. The injection molding process being utilized and a structure of "cover/polymer monolith" ensures the interface integrity. It is essential for making the present invention novel.
2. Strengthening the interface between the current collecting post and the injection molded first polymer body. This is achieved by forcing the top and bottom flanges together when fusing them to the polymer material. The present invention also intends to increase diffusion paths by using the top and bottom flanges that fuse to the injection molded first polymer body. Without the use of top and bottom flanges, leakage can more easily occur at the interface between the current collecting post and an injection molded first polymer body, because of a shorter diffusion path.
3. Other steps involved are essential for blocking any new interfaces created while using the top and bottom flanges. The steps include the insulation material coated on the bottom surface of the bottom flange (delays the penetration originating from possible bidirectional leakage into or out of the battery through the interface at the current collecting posts, as indicated in FIG. 1(d)); laser welding between the top flanges and the current collecting posts (prevention of leakage through the top flange and the current collecting post interface, as indicated in FIG. 1(e)); and one more layer of polymer coating that protects the edges of the top flange (prevention of leakage through the interface at the edge of the top flange, as indicated in FIG. 1(f)).

The choice of materials being utilized for the injection molded polymer layer includes, but is not limited to Polyethylene (PE), Polypropylene (PP), PU, Nylon, PET, ABS, FEP, Polyimide, Polyacrylic, Epoxy Resin or a combination of listed materials. The area of the injection molded first polymer body between the top and bottom flanges is preferred to extend beyond the edges of the opening that hosts the current collecting post. The distance between the edge of the injection molded first polymer body to the edge of the opening that hosts the current collecting post is preferred to be more than 0.5 cm. That is the polymer should extend beyond the edge of the opening at least 0.5 cm. A full coverage of the entire cover is encouraged provided that the weight of the polymer is acceptable for the overall battery design. The overall thickness of the injection molded first polymer body is preferred to be more than 2 mm. A thicker polymer layer having better integrity is encouraged if the weight of the polymer layer is acceptable for the overall battery design.

The choice of materials being utilized for the top flange includes either a metal or a polymer flange. If metal is used, a sealing (e.g. laser sealing) between the top flange and the current collecting post should be made. If a polymer top flange is used instead of a metal top flange, a high temperature fusing between the top flange and the current collecting post should be conducted. The size of the top flange is preferably larger than the opening that hosts the current collecting post. An extension of 0.5 cm or more beyond the edge of the opening is preferred.

The choice of materials being utilized for the bottom flange should be metal that possesses high electrical conductivity since the bottom flange is used to connect to the electrodes or electrode booklets. The size of the bottom flange is preferably larger than the opening that hosts the current collecting post. An extension of 0.5 cm or more beyond the edge of the opening is preferred.

The choice of materials for coating the surface of the bottom flange can be the same material used for the injection molded polymer layer or it can be different. The choices include Polyethylene (PE), Polypropylene (PP), PU, Nylon, PET, ABS, FEP, Polyimide, Polyacrylic, Epoxy Resin or a combination of listed materials. A portion of the bottom flange at which the electrodes are to be connected should not be coated.

The choice of materials for coating the top of the injection molded first polymer body can be the same as the injection molded first polymer body or different. Again, the choices include Polyethylene (PE), Polypropylene (PP), PU, Nylon, PET, ABS, FEP, Polyimide, Polyacrylic, Epoxy Resin or a combination of listed materials.

Figure 1G:
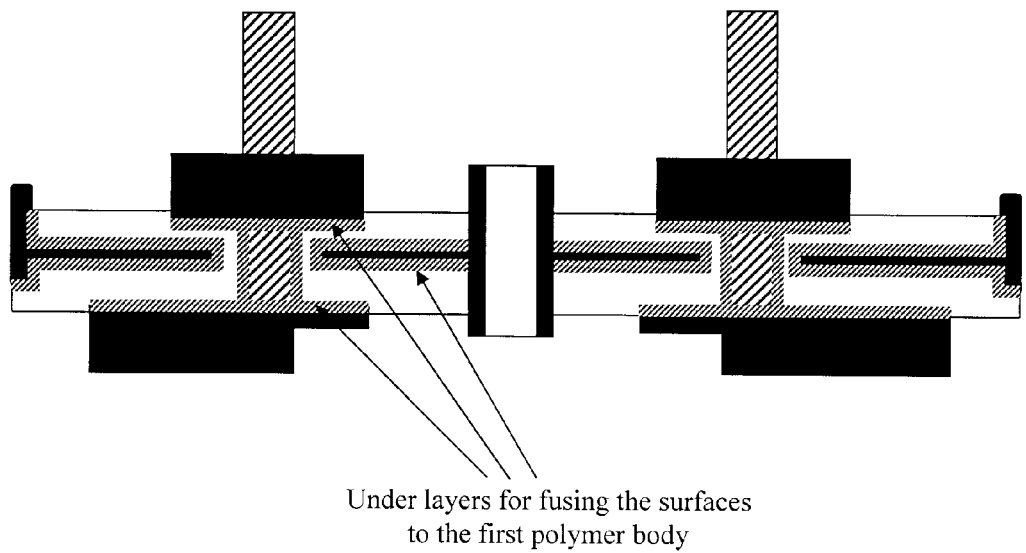

In the present example, if the injection molded polymer does not exhibit sufficient fusing at the interfaces with the top and bottom flanges and the current collecting posts as well as at the cover surfaces, under-layers should be used for fusing at the interfaces between the top flange/injection molded first polymer body; the bottom flange/injection molded first polymer body; the current collecting post/injection molded first polymer body and the cover surface/injection molded first polymer body (as shown and indicated in FIG. 1(g)). The materials to be used for under-layers are styrene butadiene rubber (SBR), glue, or any other materials that possessing excellent adherence to the metal surfaces and the injection molded polymer. Additionally, the under-layer could be an anodized layer on the metallic surface being fused that increases the roughness of the metallic surface to enhance the adherence of the metal to the polymer layer. A combination of an anodized metal surface with the utilization of a polymer under-layer is also included in the present invention.

EXAMPLE II

An Alternative Form of Assembly of the Present Invention

Figure 2A:
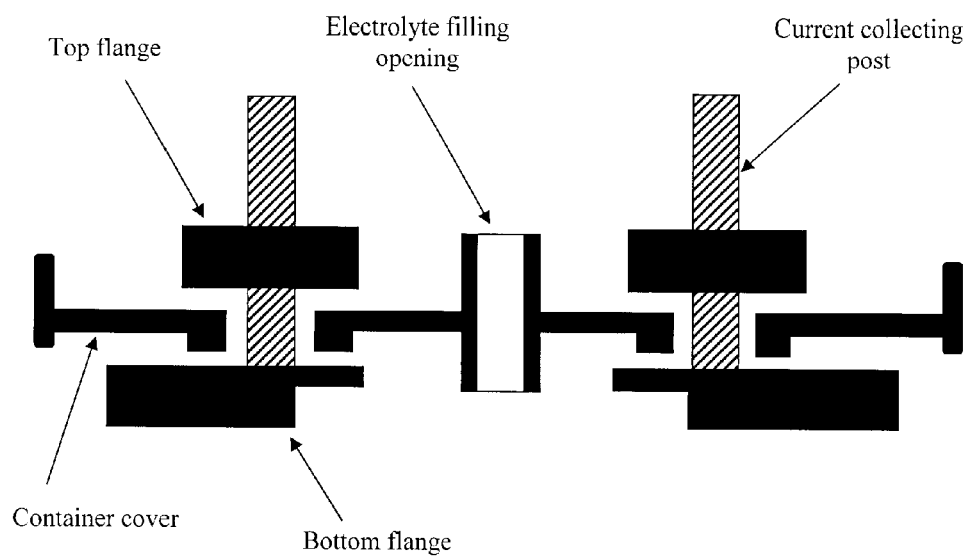
FIGS. 2(a) to 2(c) are side views of a cover assembly of the invention, showing progressive steps of a second fabrication method.
Figure 2B:
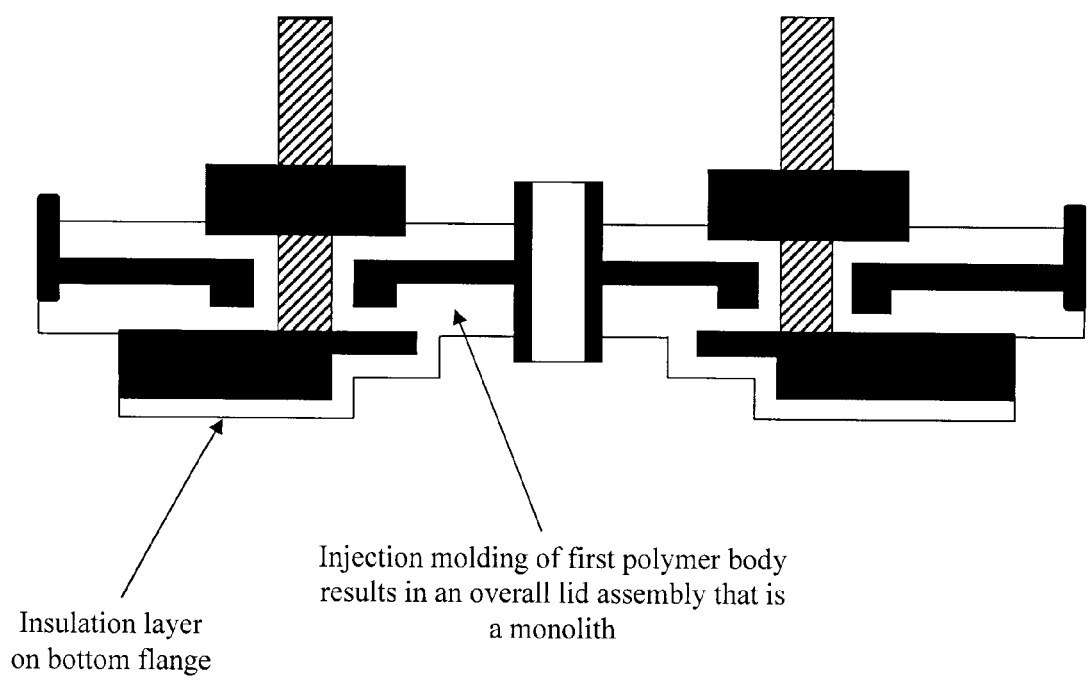
Figure 2C:
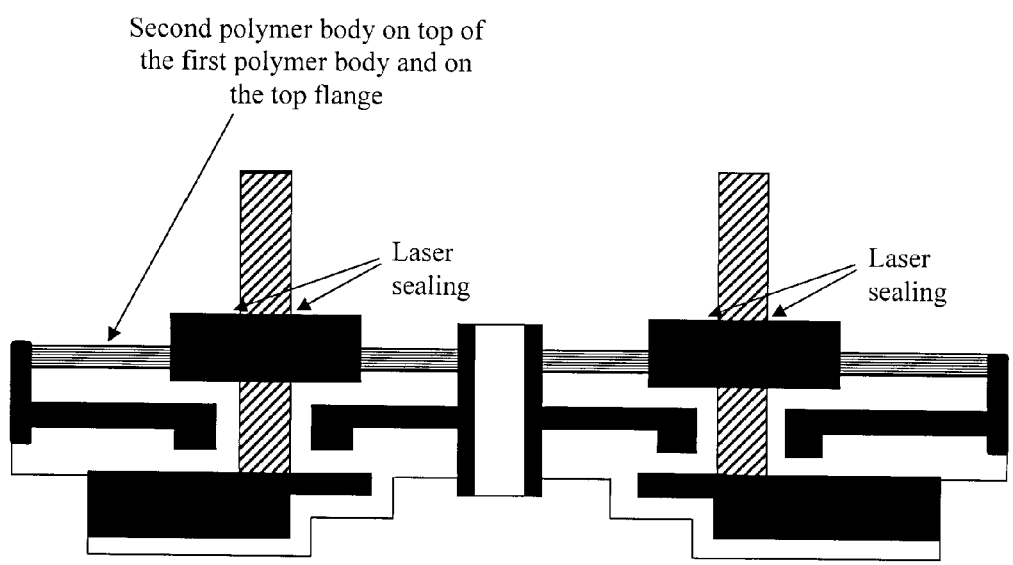

Referring to FIGS. 2(a)-2(c) a current collecting post, a top flange, a bottom flange and a cover are pre-assembled via mechanical assembling or welding. The current collecting posts, top flanges, and bottom flanges are assembled relative to the cover using a mold, in the configuration shown in FIG. 2(a), and the polymer injection molding is conducted on the overall assembly. The resultant cover becomes a monolith as shown in FIG. 2(b). The top flanges are then sealed to the current collecting posts followed by filling a second polymer body on top of the injection molded first polymer body as shown in FIG. 2(c). Since high pressure is used during the injection molding process, a condition similar to forcing the top and bottom flanged together, as in the first method of fabrication described above, can be achieved via the present injection molding process. It should be noted that the sealing between the top flange and the current collecting post, by laser welding for example, can be conducted before the injection molding process. It is further possible that the current collecting post, top flange, and bottom flange assembly can be made by assembling two parts (with one of the parts of the combination being either a current collecting post/top flange assembly or a current collecting post/bottom flange assembly) that are made separately by means of machining of a metal block, casting, or extrusion of metals.

The container cover can be designed in any shape (e.g. circle, oval, rectangular, . . . etc) with edges being shaped other than flat (Please refer to all figures in FIGS. 2(a)-3(e) In FIGS. 2(a)-3(e), all container cover edges are designed to possess "lip" kind of structure for further increasing the diffusion length and polymer/cover interface integrity.

Figure 2D:
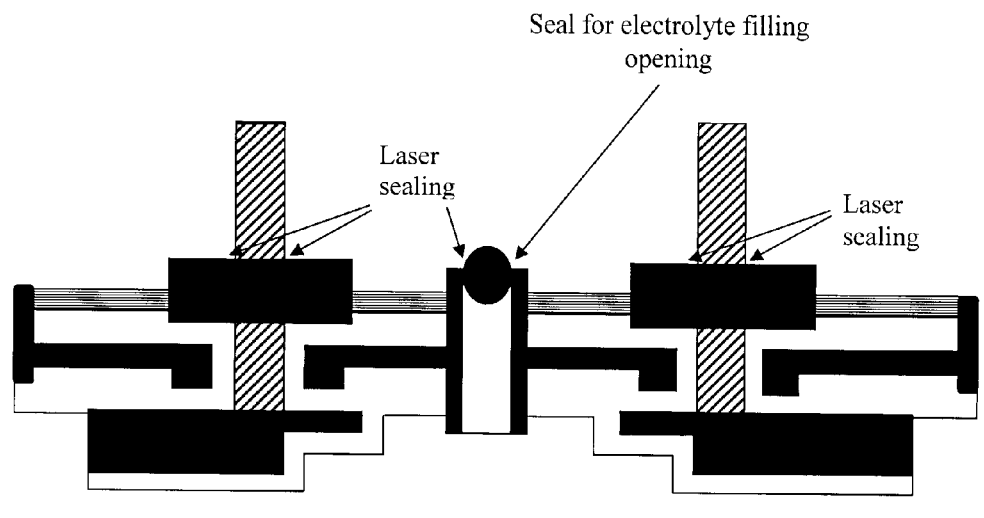
FIG. 2(d) is a side view of the cover assembly of the invention showing various seals of electrolyte filling openings.
Figure 2D:
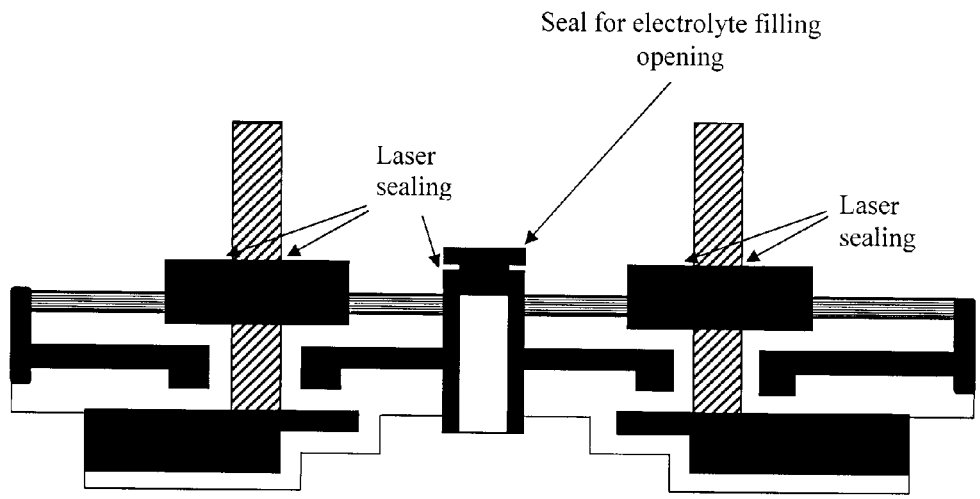

After the cover is welded on the battery container of a finished battery, an electrolyte can be filled through the fill port. A final seal can be done by welding a metal ball or a small cap on top of the fill port as shown in FIG. 2(d).

Similar to under-layer materials to be used in Example I, in the present example if the injection molded polymer does not exhibit sufficient interface property (adherence or fusing) to the top and bottom flanges as well as the cover surface, an under-layer material can be pre-applied on the surface of flange surfaces. Fusing at interfaces between the top flange/injection molded polymer, the bottom flange/injection molded polymer, the current collecting post/injection molded first polymer, and the cover surface/injection molded polymer (as shown and indicated in FIG. 1(g)) takes place during the subsequent injection molding process. The materials to be used for under-layers can be styrene butadiene rubber (SBR) glue, or any other materials that possesses excellent adherence to the metal surfaces and the injection molded polymer. Additionally, the under-layer can be an anodized layer on the metallic surface that increases the roughness of the metallic surface thus enhancing the adherence of the metal to the polymer. A combination of an anodized metal surface with the utilization of a polymer under-layer is also included in the present invention.

EXAMPLE III

An Extended Form of the Present Invention

A cell cover may contain not only the openings for positive and negative current collecting posts but also additional openings for electrolyte filling or safety venting. One more example is given here for describing the design and method for making a cell cover that contains current collecting posts, an electrolyte filling opening, as well as a safety vent.

Figure 3A:
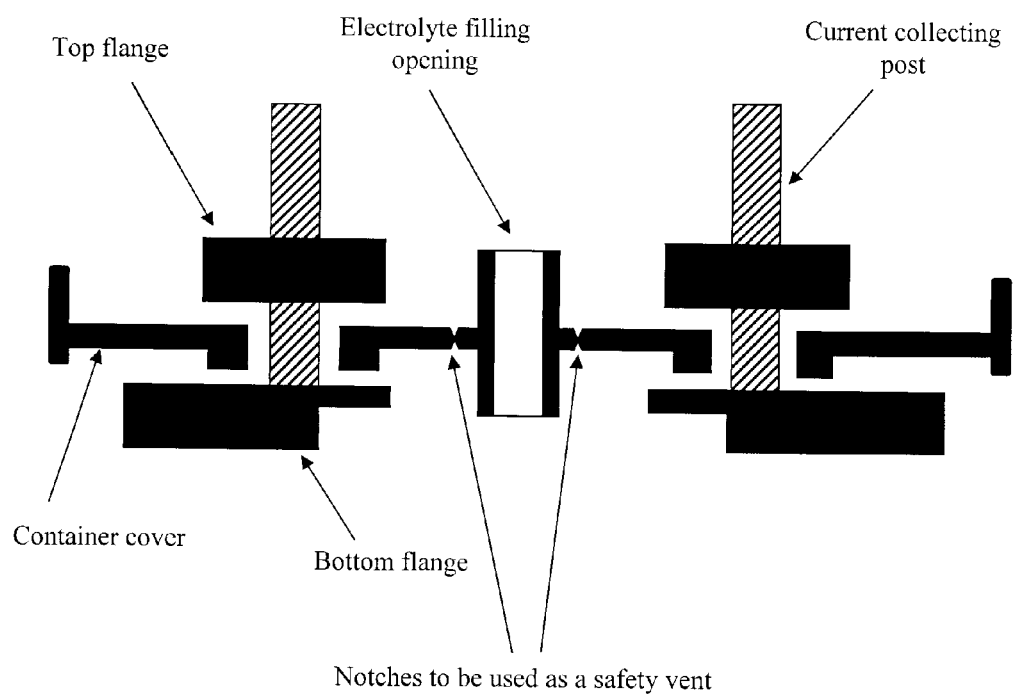
FIGS. 3(a)-3(d) are side views of the cover assembly of the invention showing various safety vents and electrolyte filling holes and methods of sealing same.
Figure 3B:
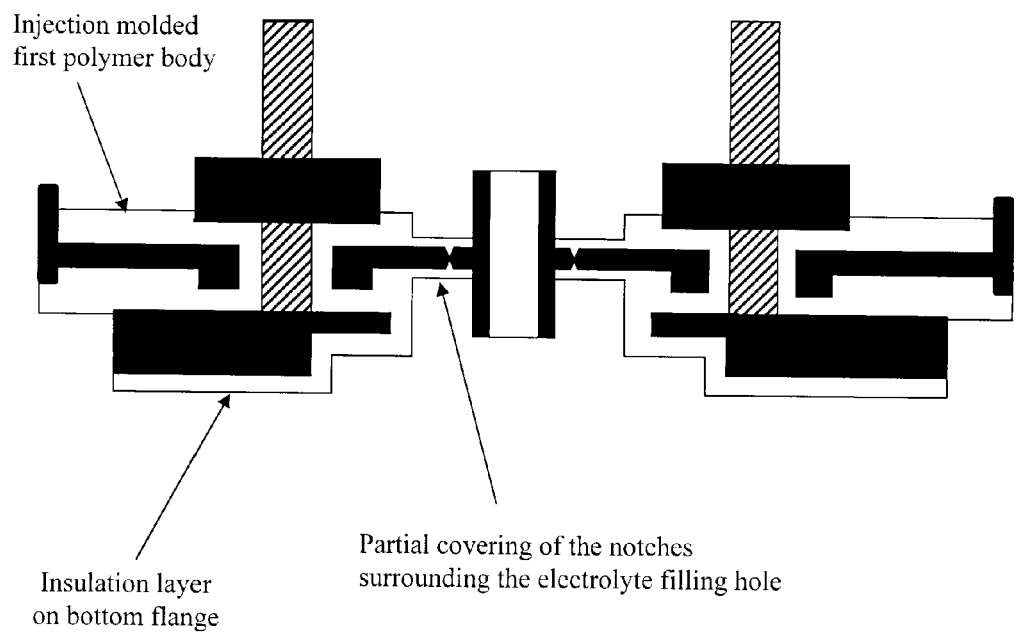
Figure 3C:
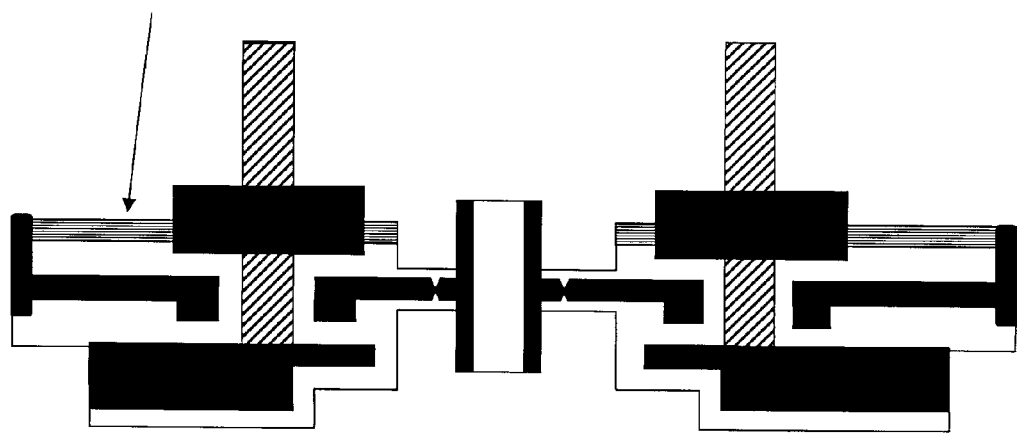
Figure 3D:
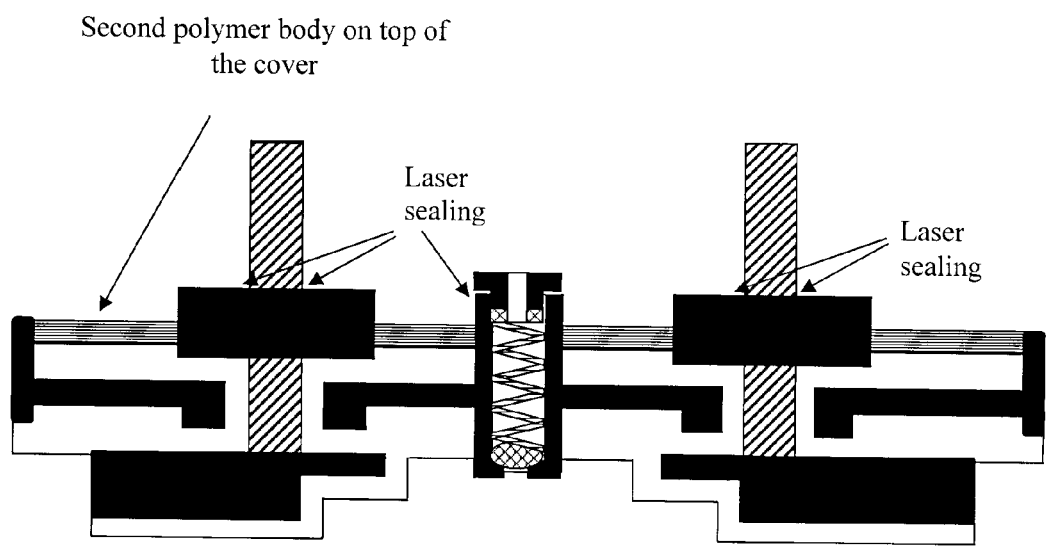
Figure 3E:
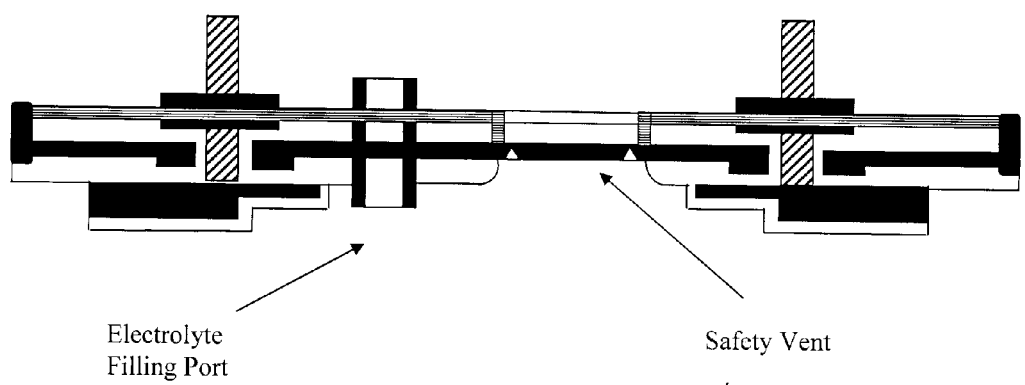
FIG. 3(e) is a side view and top view of the cover assembly of the invention showing still another variation in the location of a safety vent and an electrolyte filling hole.
Figure 3E:
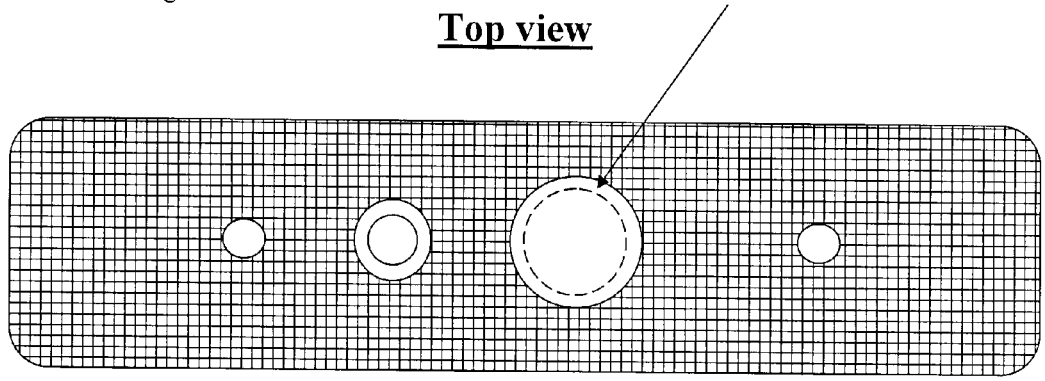

For clarity, the method described in Example II is utilized in the present example. FIG. 3(a) shows a cover containing a notch around the opening for electrolyte filling. The notch having a reduced metal thickness is designed to be a safety vent that breaks outward when internal cell pressure is built up undesirably. A current collecting post, a top flange and a bottom flange are pre-assembled via mechanical assembling or welding. The current collecting posts, top flanges, and bottom flanges are assembled relative to the cover using a mold, in the configuration shown in FIG. 3(a), and then injection molding is conducted on the overall assembly. The resultant cover becomes a monolith as shown in FIG. 3(b). During the injection molding process, the polymer injected can be chosen to cover the notches fully, partially (with shallower depth), or not covering the notches, by adjusting the shape of the mold. In FIG. 3(b), the injected polymer is covering the notches partially. Partial covering is preferred since the notches are protected by the polymer layer yet the polymer layer is not significantly preventing the notches from performing normally. The top flange is then sealed to the current collecting post followed by providing a second polymer body on top of the injection molded first polymer body as shown in FIG. 3(c). It should be noted that the second polymer body can cover the notch area fully, partially (with a shallower depth), or not cover the notches. In FIG. 3(c) the second polymer body is shown to not cover the notch (safety vent) area. In the current example, the cover structure is not limited to the arrangements and design of the safety vent or the electrolyte filling port shown in the drawings. Additional examples are given here for the design and arrangement of the electrolyte filling port and the safety vent. For example, a safety vent can be designed in combination with the filling port as shown in FIG. 3(d), or it may be an independently designed mechanism installed at a separate place on the battery cover as shown in FIG. 3(e).

In all of the examples given above, an increase distance for a diffusion path and the enhancement of the metal to polymer interface fusing for any openings present on the battery cover, form the basis of the present invention. The placement and shape design of current collecting posts, electrolyte filling port, and safety vent are not limited to the examples given in the present examples. The structure of polymer layers and the method utilized for constructing the battery cover are applicable to any combination and numbers of current collecting posts, electrolyte filling ports, and safety vents to be present on top of a battery cover. The present invention also applies to the arrangement in which the container and cover take the place of a current collecting post and only one current collecting post is needed.

What is claimed is:

1. A cover monolith assembly for a Lithium-ion battery container, comprising
    a cover for sealing a top opening of a battery container, said cover defining one or more openings for current collecting posts;
    a current collecting post extending through each opening and having a gap between the current collecting post and the cover;
    a top flange encircling each current collecting post, disposed to be opposed to and displaced from a top surface of said cover and extending radially outward from the current collecting post to beyond edges of the opening;
    a bottom flange encircling each current collecting post, disposed to be opposed to and displaced from a bottom surface of said cover and extending radially outward from the current collecting post to beyond edges of the opening; and
    a first polymer body for each current collecting post, wherein
    said first polymer body, said cover and said current collecting post form a monolith structure,
    said first polymer body is continuous and extends to fill all gaps formed between any of the cover, current collecting post, top flange and bottom flange, and
    said first polymer body is fused to the cover, current collector post, top flange and bottom flange where contacting same.

2. The cover monolith assembly of claim 1, further comprising
    insulating material on a bottom surface of each bottom flange, for electrically insulating each bottom flange from other components of the battery.

3. The cover monolith assembly of claim 1, further comprising
    a welded seal between each current collecting post and its top flange.

4. The cover monolith assembly of claim 1, further comprising
    a second polymer body covering, and fused to a top surface of the first polymer body and the surface of the top flange, including the junction interface of the first polymer body and the top flange.

5. The cover monolith assembly of claim 1, wherein
    surfaces of at least one of the cover, top flange and bottom flange are provided with an under-layer for promoting fusing, of the surfaces to the first polymer body.

6. The cover monolith assembly of claim 5, wherein
    the under-layer consists of at least one of styrene butadiene rubber, glue and an anodized layer of the material being provided with the under-layer.

7. The cover monolith assembly of claim 1, wherein
    each first polymer body is formed of Polyethylene (PE), Polypropylene (PP), PU, Nylon, PET, ABS, FEPa Polyimide, Polyacrylic, Epoxy Resin, or a combination of same.

8. The cover monolith assembly of claim 1, wherein
    each top flange is fabricated of metal or a polymer, and each bottom flange is fabricated of a metal.

9. The cover monolith assembly of claim 1, wherein
    each top flange and bottom flange extends radially outwardly beyond edges of its opening at least 0.5 cm.

10. The cover monolith assembly of claim 4, wherein
    each second polymer body is formed of Polyethylene (PE), Polypropylene (PP), PU, Nylon, PET, ABS, FEP, Polyimide, Polyacrylic, Epoxy Resin, or a combination of same.

11. The cover monolith assembly of claim 1, wherein
    the cover further includes at least one of an electrolyte filling opening and a safety venting means, and the first polymer body is fused to same.

12. A cover monolith assembly for a Lithium-ion battery container, comprising
    a cover for sealing a top opening of a battery container, said cover defining one or more openings for current collecting posts;
    a current collecting post extending through each opening and having a gap between the current collecting post and the cover;
    a top flange encircling each current collecting post, disposed to be opposed to and displaced from a top surface of said cover and extending radially outward from the current collecting post to beyond edges of the opening;
    a bottom flange encircling each current collecting post, disposed to be opposed to and displaced from a bottom surface of said cover and extending radially outward from the current collecting post to beyond edges of the opening;
    a first polymer body for each current collecting post, wherein
    said first polymer body, said cover and said current collecting post are a monolith structure,
    said first polymer body is continuous and extends to fill all gaps formed between any of the cover, current collecting post, top flange and bottom flange, and
    said first polymer body is fused to the cover, current collector post, top flange and bottom flange where contacting same;
    an insulating material on a bottom surface of each bottom flange, for electrically insulating each bottom flange from other components of the battery; and
    a second polymer body for each current collecting post, covering and fused to a top surface of the first polymer body and the surface of the top flange, including the junction interface of the first polymer body and the top flange.

13. A method of fabricating a cover monolith assembly for a lithium-ion battery container, comprising
    providing a cover for sealing a top opening of a battery container, said cover defining one or more openings for current collecting posts;
    providing a current collecting post extending through each opening and having a gap between the current collecting post and the cover;
    providing a first polymer body by injection molding a polymer to fill both of the gaps, and provide a polymer coating to both top and bottom surfaces of the cover at portions of the cover surrounding the current collecting posts, said first polymer body being fused to the cover and current collecting post where contacting same, and said first polymer body, said cover and said current collecting post being a monolith structure;
    providing a top flange encircling each current collecting post and extending radially outward from the current collecting post to beyond edges of the opening, the top flange being disposed to be in contact with the first polymer body on the top surface of the cover;
    providing a bottom flange encircling each current collecting post and extending radially outward from the current collecting post to beyond edges of the opening, the bottom flange being disposed to be in contact with the first polymer body on the bottom surface of the cover; and applying pressure to the top and bottom flange of each current collecting post to fuse each flange to the first polymer body.

14. The method of fabricating the cover monolith assembly of claim 13, wherein
   each flange and each first polymer body are heated prior to applying pressure to fuse each flange to the first polymer body.

15. A method of fabricating a cover monolith assembly for a lithium-ion battery container, comprising
   providing a cover for sealing a top opening of a battery container, said cover defining one or more openings for current collecting posts;
   providing a current collecting post extending through each opening and having a gap between the current collecting post and the cover;
   providing a top flange encircling each current collecting post, disposed to be opposed to and displaced from a top surface of said cover and extending radially outward from the current collecting post to beyond edges of the opening;
   providing a bottom flange encircling each current collecting post, disposed to be opposed to and displaced from a bottom surface of said cover and extending radially outward from the current collecting post to beyond edges of the opening; and
   providing a first polymer body by injection molding for each current collecting post, wherein
   said first polymer body, said cover and said current collecting post are a monolith structure,
   said first polymer body is continuous and extends to fill all gaps formed between any of the cover, current collecting post, top flange and bottom flange, and
   said first polymer body is fused to the cover, current collecting post, top flange and bottom flange where contacting same.

16. The method of fabricating the cover monolith assembly of claim 13 or 15 further comprising
   coating a bottom surface of each bottom flange with an insulating material for electrically insulating each bottom flange from other components of the battery.

17. The method of fabricating the cover monolith assembly of claim 13 or 15, further comprising
   providing a second polymer body covering and fused to a top surface of the first polymer body and the surface of the top flange, including the junction interface of the first polymer body and the top flange.

18. The method of fabricating the cover monolith assembly of claim 13 or 15, further comprising
   providing an under-layer to surfaces of components fused to the first polymer body, for promoting fusing of the surfaces to the first polymer body.

19. The method of fabricating the cover monolith assembly of claim 18, wherein
   the under-layer consists of at least one of styrene butadiene rubber, glue and an anodized layer of the material being provided with the under-layer.

20. The method of fabricating the cover monolith assembly of claim 13 or 15, wherein
   each first polymer body is formed of Polyethylene (PE), Polypropylene (PP), PU, Nylon, PET, ABS, FEP, Polyimide, Polyacrylic, Epoxy Resin, or a combination of same.

21. The method of fabricating the cover monolith assembly of claim 13 or 15, wherein
   each top flange is fabricated of metal or a polymer, and each bottom flange is fabricated of metal having high electrical conductivity.

22. The method of fabricating the cover monolith assembly of claim 13 or 15, wherein
   each top flange and bottom flange extends radially outwardly beyond edges of its opening at least 0.5 cm.

23. The method of fabricating the cover monolith assembly of claim 17, wherein
   each second polymer body is formed of Polyethylene (PE), Polypropylene(PP), PU, Nylon, PET, ABS, HP, Polyimide, Polyacrylic, Epoxy Resin, or a combination of same.

24. The cover monolith assembly of claim 1 or 12, wherein the cover is formed to have a lip extending around each opening for the current collecting post.

25. The cover monolith assembly of claim 1 or 12, wherein the first polymer body is continuous over the entire top surface and bottom surface of the cover.

* * * * *